C. L. H. WITTMAACK.
ARRANGEMENT FOR DRIVING SHIPS' PROPELLERS.
APPLICATION FILED JULY 23, 1918.

1,336,770. Patented Apr. 13, 1920.
3 SHEETS—SHEET 1.

Inventor
Christian L. H. Wittmaack.

UNITED STATES PATENT OFFICE.

CHRISTIAN LUDWIG HEINRICH WITTMAACK, OF ZEHLENDORF, NEAR BERLIN, GERMANY.

ARRANGEMENT FOR DRIVING SHIPS' PROPELLERS.

1,336,770.  Specification of Letters Patent.  Patented Apr. 13, 1920.

Application filed July 23, 1918. Serial No. 246,406.

*To all whom it may concern:*

Be it known that I, CHRISTIAN LUDWIG HEINRICH WITTMAACK, a subject of the King of Prussia, German Emperor, residing at the village of Zehlendorf, near Berlin, in the Kingdom of Prussia, Germany, have invented certain new and useful Improvements in Arrangements for Driving Ships' Propellers, of which the following is a specification.

The present invention relates to an arrangement for driving two ships' propellers revolving in opposite directions.

The novel feature of the invention consists in the arrangement for driving two propellers disposed behind each other on the same shaft and by which the direction of the revolution of the said propellers may be reversed by engaging and disengaging, respectively, clutches or by shifting gears without the revolution of the driving engines having to be reversed.

In the new arrangement two parallel shafts revolving in opposite directions are employed for driving the two propellers; these shafts always revolve in the same direction so that it is unnecessary to reverse the driving engines.

The driving engines continue their revolution without any reversing, the one engine driving the one of said shafts in one sense, the other engine driving the other shaft in the opposite sense.

The present invention, now, consists in the arrangement for driving propellers fitted on parallel shafts in opposite directions by means of two parallel driving shafts revolving in opposite directions, which driving shafts are coupled by means of clutches or shifting gears with either of the two propeller shafts.

In the accompanying drawings Figure 1 is a sectional view of the new arrangement in the position for steaming ahead.

Figure 1:
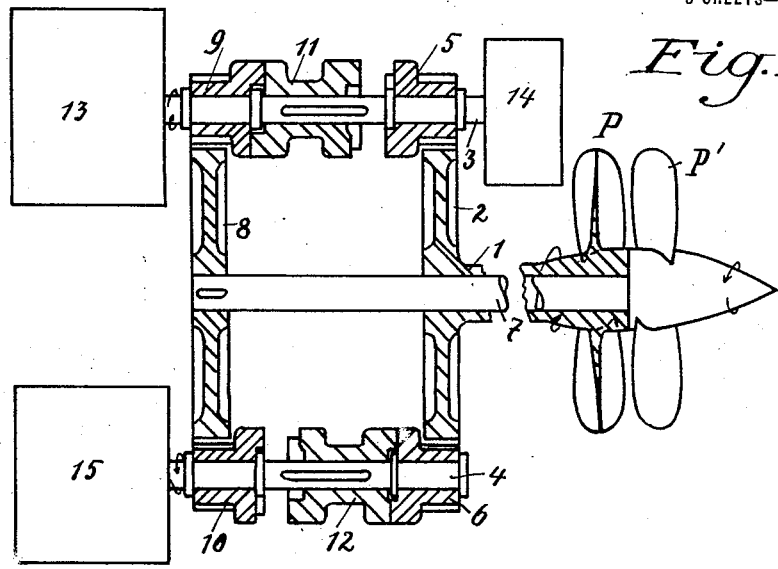

Fitted to the propeller shaft 1, on which is secured the propeller P, is a toothed wheel 2. 3 is the one driving shaft, 4 the other driving shaft. To shaft 3 is fitted revolubly but not shiftable a toothed wheel 5; and to shaft 4 is fitted likewise revolubly but not shiftable a toothed wheel 6. 7 is the other propeller shaft to which is fitted the second propeller $P^1$. Shaft 1 revolves on shaft 7. To the latter is keyed the toothed wheel 8 which engages in the wheels 9 and 10. The wheel 9 is fitted revolubly and not shiftable on shaft 3, and wheel 10 revolubly but not shiftable on shaft 4. Between wheels 5 and 9 is fitted on shaft 3 an engageable clutch 11 shiftable but not revoluble thereon. By means of clutch 11 the wheel 5 or 9, respectively, may be coupled to shaft 3 so that it revolves together with said shaft 3.

By means of clutch 12 the wheel 6 or 10, respectively, is coupled to shaft 4, so that it must revolve with the same, when the clutch engages wheel 6 or 10, respectively. 13 and 14 are the engines revolving clockwise, for driving shaft 3; 15 is the engine driving the shaft 4 counterclockwise.

The operation of the new arrangement is as follows:

When in stopping position the engines 13, 14 and 15 are at a standstill. In the ahead steaming position, when the parts are in the positions shown in Fig. 1, the driving shafts 3 and 4 are coupled by clutches 11 and 12, respectively, with wheels 6 and 9, respectively. The wheel 8 and the propeller shaft 7 are driven counter-clockwise by the wheel 9 being driven by means of clutch 11 from the shaft 3 revolving clockwise, and meshing with wheel 8. Wheel 2 and the propeller shaft 1 are driven clockwise, as the counterclockwise shaft 4 turns the wheel 6 coupled thereto by means of clutch 12 counterclockwise, and wheel 6 meshing with wheel 2.

The wheels 5 and 10 revolve idle on shafts 3 and 4, respectively in opposite directions to wheels 8 and 9, respectively.

The shaft 7, on which is secured the propeller $P^1$ will therefore revolve counterclockwise, shaft 1 with propeller P clockwise, as engine 15 runs counterclockwise.

Figure 2:
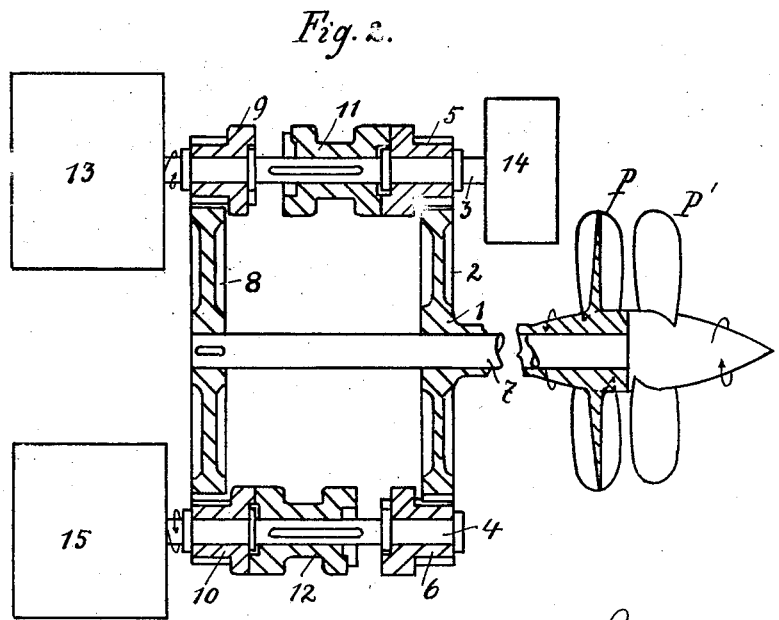
Fig. 2 shows the same arrangement for steaming astern.
Figure 3:
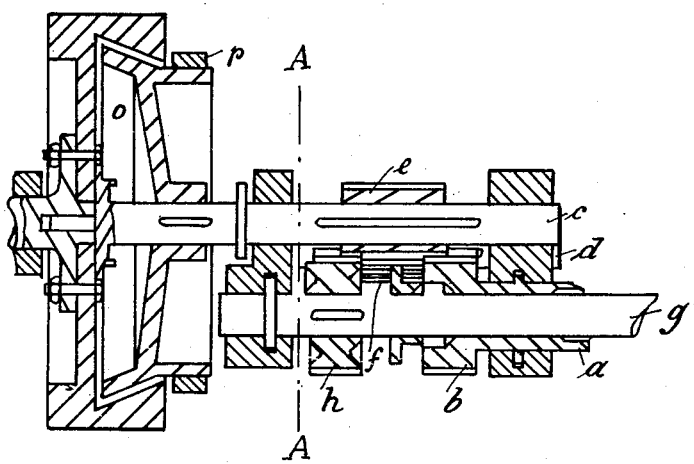
Fig. 3 shows a modification in stopping position.
Figure 6:
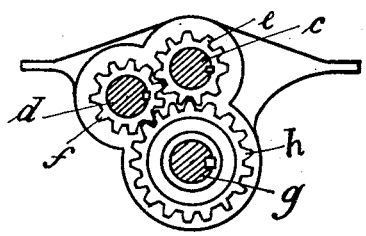
Fig. 6 is a section on the line A—A in Fig. 3.
Figure 4:
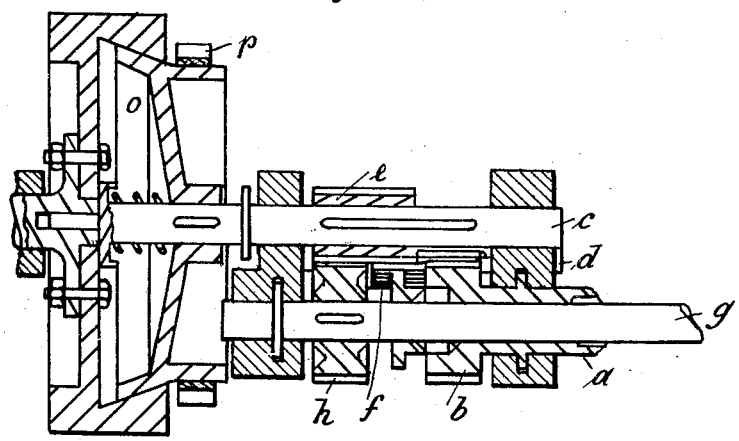
Fig. 4 is the same modification for steaming ahead.
Figure 5:
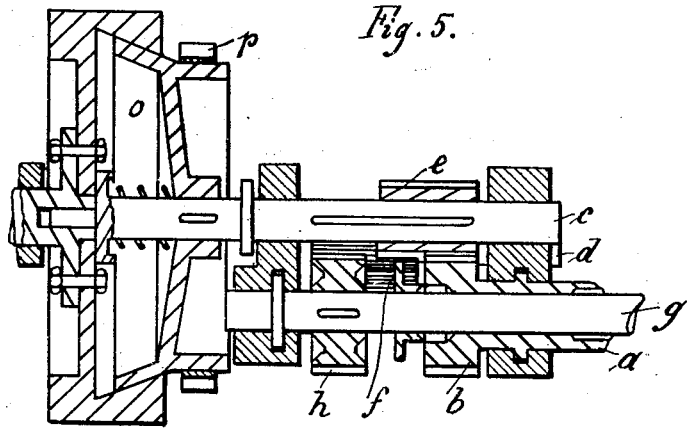
Fig. 5 is the same modification for steaming astern.

In the astern steaming position (Fig. 2) the driving shafts 3 and 4 are coupled by clutches 11 and 12, respectively, to wheels 5 and 10, respectively. Wheel 8 and propeller shaft 7 revolve with shaft 4 clockwise. Wheel 2, meshing with wheel 5 runs counterclockwise, as it meshes with the wheel 5 coupled to the clockwise shaft 3. Wheels 6 and 9 run idle.

The propellers fitted to shafts 1 and 7, respectively, revolve in the same direction as their shafts.

The modification shown in Figs. 3 to 6 consists of shafts $a$ and $g$ on which are fitted the propellers P, P$^1$ (not shown), the driving shafts $c$ and $d$ and the toothed wheels $e$, $f$, $h$. On driving shaft $c$ is fitted, shiftable but not revoluble thereon a wheel $e$, on driving shaft $d$ the wheel $f$, shiftable but not revoluble thereon, and on shaft $g$ is immovably fitted a wheel $h$.

The two driving shafts are so disposed that the wheels $e$ and $f$ mesh with each other.

On the driving shaft $c$ is fitted shiftable but not revoluble thereon a friction clutch disk $o$ which couples the shaft $c$ with its driving engine, when the clutch is moved into engaging position. By means of a brake strap $p$ the clutch disk may be braked.

When the arrangement is in stopping position this friction clutch is disengaged, the friction disk $o$ being moved forward, and the brake strap $p$ arrested.

The wheels $e$ and $f$ are in intermediate position and hold the driving shaft $d$ and the propeller shafts $a$ and $g$.

In ahead steaming position (Fig. 4) the brake strap is released, the friction disk $o$ moved backward. The wheel $e$ is moved forward, the wheel $f$ rearward. Wheel $e$ meshes with the wheel $h$ fixed on shaft $g$, wheel $f$ with the wheel $b$ fitted to shaft $a$.

The driving shaft $c$ and the propeller shaft $g$ revolve in the same sense as the driving engine, the driving shaft $d$ and the propeller shaft $a$ in the opposite sense. In astern steaming position (Fig. 5) the brake strap $p$ is released, and the friction disk $o$ is moved rearward. The wheel $e$ is moved rearward, the wheel $f$ forward. The driving shaft $c$ and the propeller shaft $a$ revolve in the same sense as the driving engine, the driving shaft $d$ and the propeller shaft $g$ in opposite sense.

I claim:

1. In an arrangement for driving ships' propellers in opposite directions, the combination of two parallel driving shafts rotating in opposite directions, two co-axial propeller shafts, on each of which is fitted a propeller, toothed wheels on said propeller shafts meshing with other toothed wheels fitted loose on the driving shafts, and clutches shiftable but not rotatable on said driving shafts engaging with the toothed wheels fitted on said driving shafts.

2. In an arrangement for driving ships' propellers, the combination with a pair of propeller shafts rotating in opposite directions; of a pair of parallel shafts also driven in opposite directions to the propeller shafts, gearing connecting the driving and propeller shafts and mechanism on one of the driving shafts to change the driving relation of the gears on the driving shafts to reverse the direction of the propeller shaft geared thereto.

3. In an arrangement for driving ships' propellers, the combination with a pair of coaxial propeller shafts rotating in opposite directions; of a pair of driving shafts parallel to the propeller shafts, gear wheels interconnecting the driving shafts and propeller shafts, and means to change the driving relation of said gear wheels to reverse the direction of the propeller shafts.

4. In an arrangement for driving ships' propellers, the combination with a pair of propeller shafts rotating in opposite directions; of a pair of driving shafts parallel to the propeller shafts, a gear wheel on each propeller shaft, both of said gear wheels being capable of being driven from the driving shafts, and means on said driving shafts to shift the driving relation from one gear wheel to the other and vice versa.

5. In an arrangement for driving ships' propellers, the combination with a pair of coaxial propeller shafts and a gear wheel on each shaft; of a pair of oppositely rotating driving shafts each having a loose wheel meshing with each of the aforesaid wheels, and a clutch element on each shaft capable of connecting either wheel thereon to the shaft.

In testimony whereof I have affixed my signature in presence of a witness.

CHRISTIAN LUDWIG HEINRICH WITTMAACK.

Witness:
BRICOPP V. HERTLING.